2,801,235
PROCESS OF METHYLATING GLUTEN

Walter M. Miley, Worthington, Ohio, assignor to National Industrial Products Company, a corporation of Ohio No Drawing. Application June 27, 1955, Serial No. 518,345

1 Claim. (Cl. 260—112)

The invention disclosed in this application relates to methylated gluten and to processes for its production.

One object of the invention therefore is the preparation of new and useful methylated glutens.

A further object of the invention is the provision of new processes for the reaction of gluten to form methylated glutens.

Further objects and features of the invention will be apparent from the following specification and claim.

I have found that I can prepare methylated glutens (or gluten methylates) in several ways, one of which has distinct advantages over the other methods which I have discovered.

I have found that I can obtain methylated gluten by suspending gluten in methanol (methyl alcohol) with an acid catalyst either at room temperature for a relatively long period of time or by heating for a shorter period of time. I have also found that I can produce a good yield of methylated gluten at lower temperatures and a more methylated and a better product, and possibly at less cost, by mixing and suspending gluten and a methyl salt in an alcohol such as methanol.

The gluten used may be either gum gluten or devitalized gluten. However, I prefer to use pure wheat gluten in its natural state (i. e. gum gluten).

The methanol may be either anhydrous or aqueous. I find that any ordinary commercial methyl alcohol (i. e. natural crude; denaturing grade; pure, natural or synthetic; or 97 percent natural or synthetic) is satisfactory.

As an acid catalyst, I prefer hydrochloric acid although other catalytic acids can possibly be used in my catalytic process.

As a methyl salt I prefer to use an inorganic salt such as, for example, dimethyl sulphate, methyl chloride, etc.

I much prefer the non-catalytic process using a methyl salt because of the saving in time, in heat, and in cost of reagents, and because of the increase in the degree of methylation.

The proportions of the constituents are not critical although it is obvious that within limits, if an insufficient quantity of the methyl salt is provided, there will be less methylation than if more is provided. A greater quantity of methyl salt than is necessary for the desired result is not economical. I prefer to use up to 300 grams of gum gluten in a liter of alcohol and methylating salts up to a quantity corresponding to 100 grams (i. e. 75 cc.) of dimethyl sulfate.

I prefer to use up to sufficient methyl salt to methylate all of the carboxyl groups of the protein.

When proceeding according to the preferred embodiment of my invention I may suspend gum gluten in commercial grade methanol and add a quantity of dimethyl sulfate. If it is desirable to methylate the gluten thoroughly I may add a slight excess of dimethyl sulfate over the quantity theoretically necessary to methylate all of the carboxyl groups of the gluten. However, I prefer to add only sufficient dimethyl sulfate to methylate only a smaller proportion of the acid groups and the amount of dimethyl sulfate required is only a fraction of the weight of the gluten.

The following examples demonstrate the process of this invention using particular materials, steps and conditions. It is to be understood that these examples are furnished only by way of illustration and are not intended to be by way of limitation. The viscosity measurements in all of the following examples were made on a two percent aqueous solution.

Example I

I suspended 50 grams of dry undenatured wheat gluten in one liter of commercial methanol (97 percent natural or synthetic) and then added and mixed 20 grams of dimethyl sulfate. I heated this to 40° C. and with constant stirring maintained the suspension at that temperature for four hours. I then filtered the gluten from the alcohol, washed with alcohol, rinsed with acetone and separated the gluten from the washing by precipitation. I recovered a yield of approximately 75% of the amount of methylated gluten theoretically possible, such gluten being highly methylated. This had a viscosity of 27,000 centipoises.

Example II

I suspended 50 grams of dry undenatured wheat gluten in one liter of commercial methanol (97 percent natural or synthetic) and then added and mixed 20 grams of dimethyl sulfate. I heated this to 40° C. and maintained the suspension at that temperature for six hours. I then filtered the gluten from the alcohol, washed with alcohol, rinsed with acetone, and separated the gluten from the wash liquid by precipitation. I recovered a yield of about 84% of the amount of methylated gluten theoretically possible such gluten being highly methylated. It had a viscosity of 28,000 centipoises.

Example III

I suspended 50 grams of dry undenatured wheat gluten in one liter of commercial methanol (97 percent natural or synthetic) and then added and mixed 20 grams of dimethyl sulfate. I maintained the suspension at room temperature overnight with constant stirring. I then filtered the gluten from the alcohol, washed with alcohol, rinsed with acetone, and separated the gluten from the wash liquid by precipitation. I recovered a yield of about 75% of the amount of methylated gluten theoretically possible, such gluten being highly methylated. It had a viscosity of 28,000 centipoises.

Example IV

I suspended 50 grams of dry undenatured wheat gluten in one liter of commercial methanol (97 percent natural or synthetic) and added 8 ml. of concentrated hydrochloric acid. I heated to a temperature of 42° C. for 48 hours. On separation and analysis of the gluten I recovered a yield of 86% of the amount of methylated gluten theoretically possible. I had a viscosity of 348 centipoises. I found that it had acquired 3% of its weight in added methyl groups, but nevertheless was less highly methylated than the product of Examples I, II and III.

Example V

I suspended 50 grams of dry glutenin separated from dry undenatured wheat gluten in one liter of commercial methanol (97 percent natural or synthetic) and then added 20 grams of dimethyl sulfate. I heated this to 40° C. and maintained the suspension at that temperature for six hours. I then filtered the gluten from the alcohol, washed with alcohol, rinsed with acetone and separated the gluten from the wash liquid by precipitation. I recovered a yield of about 85% of the amount of methylated glutenin theoretically possible, such glutenin being highly methylated. It had a viscosity of 54,000 centipoises.

It is to be understood that the above described embodiments of my invention are for the purpose of illustration only and various changes may be made therein without departing from the spirit and scope of my invention.

I have found as shown above that pure glutenin reacts better than gluten and forms a product which is better for certain purposes. Gluten which has had part of the gliadin removed is intermediate in reaction and product between pure gluten and glutenin. Therefore in the following claim I intend that the word "gluten" shall be construed to mean not only a pure gluten but also a gluten which has part but not all of the gliadin removed.

I claim:

A process of preparing methylated gluten which comprises suspending about 5 parts of gluten in about 80 parts by weight of methanol, adding about 2 parts by weight of dimethyl sulfate, heating to a temperature of about 40° C. and maintaining the suspension at said temperature for approximately five hours.

References Cited in the file of this patent

Winteringham et al.: Chem. Abst., vol. 40, cols. 5849–50 (1946).